(12) United States Patent
Wieder et al.

(10) Patent No.: US 9,239,938 B2
(45) Date of Patent: Jan. 19, 2016

(54) DATA HOLDER, SYSTEM AND METHOD

(75) Inventors: Klaus A. Wieder, Helenville, WI (US); James P. Stuart, Bloomfield Hills, MI (US)

(73) Assignee: Red E Innovations, LLC, Warren, WI (US)

( * ) Notice: Subject to any disclaimer, the term of this patent is extended or adjusted under 35 U.S.C. 154(b) by 896 days.

(21) Appl. No.: 12/809,429

(22) PCT Filed: Nov. 5, 2009

(86) PCT No.: PCT/US2009/063458
§ 371 (c)(1),
(2), (4) Date: Jul. 1, 2011

(87) PCT Pub. No.: WO2010/054128
PCT Pub. Date: May 14, 2010

(65) Prior Publication Data
US 2011/0261524 A1  Oct. 27, 2011

Related U.S. Application Data

(60) Provisional application No. 61/111,725, filed on Nov. 5, 2008, provisional application No. 61/218,942, filed on Jun. 20, 2009.

(51) Int. Cl.
*G06F 1/16* (2006.01)
*G06F 21/86* (2013.01)
*B29C 45/17* (2006.01)

(52) U.S. Cl.
CPC ............... *G06F 21/86* (2013.01); *B29C 45/17* (2013.01); *B29C 2045/1796* (2013.01)

(58) Field of Classification Search
CPC . G06F 21/86; G06F 21/87; B29C 2045/1796; H05K 5/0278; H05K 5/0204; H05K 5/02221; H05K 5/061; H05K 9/005
USPC ........... 361/679.32, 730, 732, 736, 737, 740, 361/752, 753, 755; 174/541, 564, 58, 50, 174/520, 535, 542, 59; 439/133, 660, 369, 439/703, 587, 750; 257/704; 425/169, 472, 425/135

See application file for complete search history.

(56) References Cited

U.S. PATENT DOCUMENTS 5,222,026 A   6/1993  Nakamoto
5,571,539 A   11/1996 Starkey (Continued)

FOREIGN PATENT DOCUMENTS

DE   102004052499   7/2006
JP   63017009        1/1988

(Continued)

OTHER PUBLICATIONS

"Maenner's moldMIND, the Little 'Black Box' for Molds, Does a Lot More Than Just Count Shots", advertisement, unpdated.

*Primary Examiner* — Hoa C Nguyen
*Assistant Examiner* — Christopher L Augustin
(74) *Attorney, Agent, or Firm* — Boyle Fredrickson S.C.

(57) ABSTRACT

A protective data holding vault that includes a module with onboard memory that can be configured as a drive, e.g. flash drive, attached to a machine or apparatus and which securely and protectively holds data associated with the machine or apparatus and a unique identifier thereof. The vault includes a casing with a receptacle in which the module is received and a cover that is sealingly attachable to the casing to cover the receptacle and protect the module in the receptacle. The vault is mounted in a pocket on the machine or apparatus, or a component therefor or thereof, and is linkable to a processor equipped device, such as via a USB link, enabling data stored on the vault to be retrieved and stored offboard providing secure data backup. In one system implementation, data synchronization can be performed to a remotely located storage device with bidirectional data transfer contemplated.

46 Claims, 11 Drawing Sheets

(56) References Cited

U.S. PATENT DOCUMENTS

| | | | |
|---|---|---|---|
| 5,795,511 A | 8/1998 | Kalantzis et al. | |
| 6,377,649 B1 | 4/2002 | Stuart | |
| 6,529,796 B1 | 3/2003 | Kroeger et al. | |
| 7,128,548 B2 | 10/2006 | Manner | |
| 7,275,941 B1* | 10/2007 | Bushby | 439/133 |
| 7,311,136 B2 | 12/2007 | Manner | |
| 7,389,878 B1* | 6/2008 | Torrico | 206/725 |
| 7,568,942 B1* | 8/2009 | Lannon et al. | 439/521 |
| 7,649,734 B2* | 1/2010 | Okumura | 361/679.33 |
| 8,025,496 B2* | 9/2011 | Eikenberry | 425/169 |
| 8,174,836 B2* | 5/2012 | Zhao | 361/737 |
| 8,446,125 B2* | 5/2013 | Mkhitarian | 320/112 |
| 2001/0000161 A1 | 4/2001 | Laity | |
| 2003/0175375 A1 | 9/2003 | Bodmer et al. | |
| 2004/0066726 A1* | 4/2004 | Chiang | 369/75.1 |
| 2005/0081049 A1* | 4/2005 | Nakayama et al. | 713/194 |
| 2006/0082009 A1 | 4/2006 | Quail et al. | |
| 2006/0082010 A1 | 4/2006 | Saggese et al. | |
| 2007/0076382 A1* | 4/2007 | Ni | 361/752 |
| 2007/0101060 A1* | 5/2007 | Robinson et al. | 711/115 |
| 2007/0143509 A1 | 6/2007 | Ni et al. | |
| 2007/0206365 A1* | 9/2007 | Shiu et al. | 361/752 |
| 2007/0229570 A1 | 10/2007 | Ohmiya | |
| 2007/0253384 A1 | 11/2007 | Kanagala et al. | |
| 2007/0278213 A2 | 12/2007 | McMillin et al. | |
| 2008/0057258 A1 | 3/2008 | Kanno et al. | |
| 2008/0144270 A1* | 6/2008 | Dal Porto et al. | 361/684 |
| 2008/0150679 A1* | 6/2008 | Bloomfield | 340/5.7 |
| 2009/0077142 A1* | 3/2009 | Cissom | 707/204 |
| 2009/0139764 A1* | 6/2009 | Berry et al. | 174/551 |
| 2009/0323296 A1* | 12/2009 | Sanzone | 361/752 |
| 2010/0218012 A1* | 8/2010 | Joseph et al. | 713/310 |

FOREIGN PATENT DOCUMENTS

| | | |
|---|---|---|
| JP | 63209917 | 8/1988 |
| JP | 2128820 | 5/1990 |
| JP | 4212826 | 8/1992 |
| JP | 7052219 | 2/1995 |
| KR | 10-2008-0039358 | 3/2008 |
| WO | 0240247 | 5/2002 |

* cited by examiner

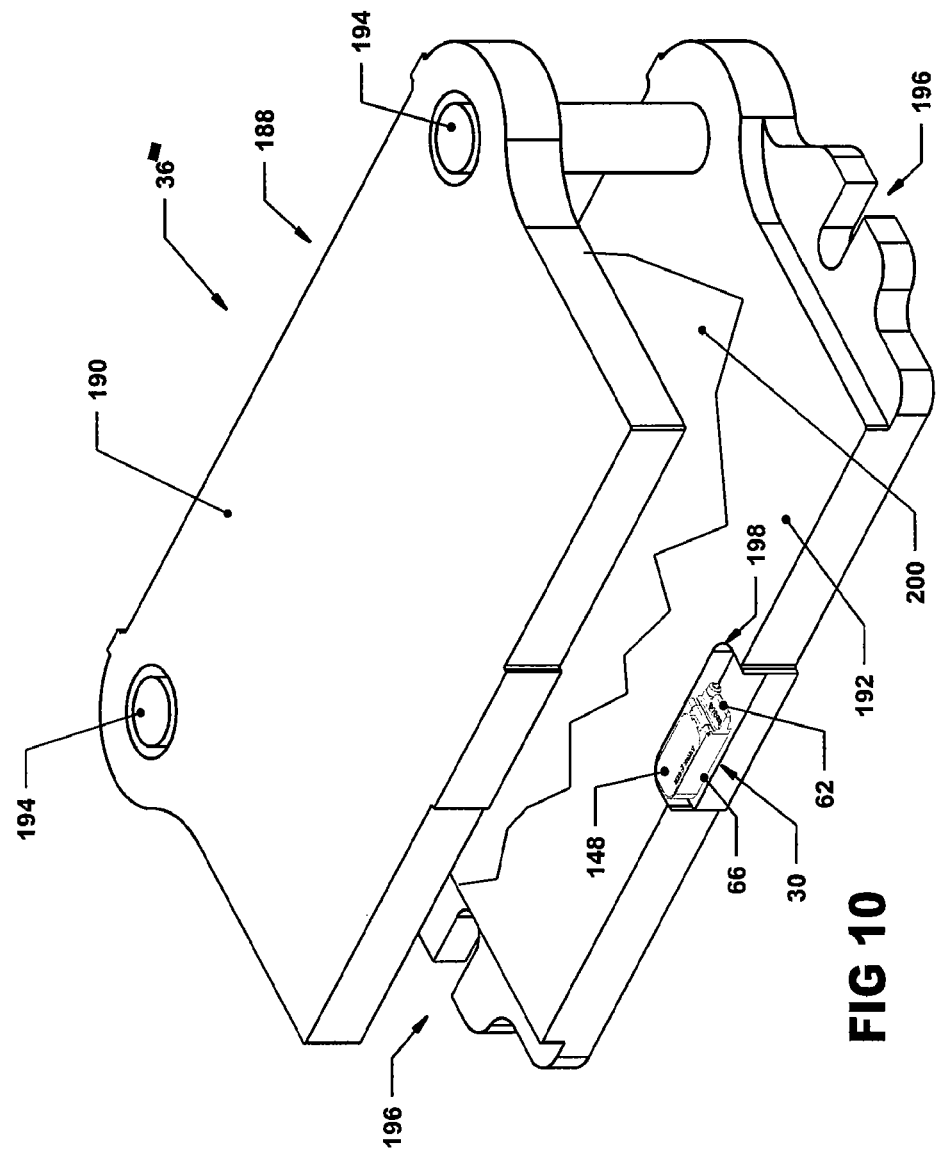

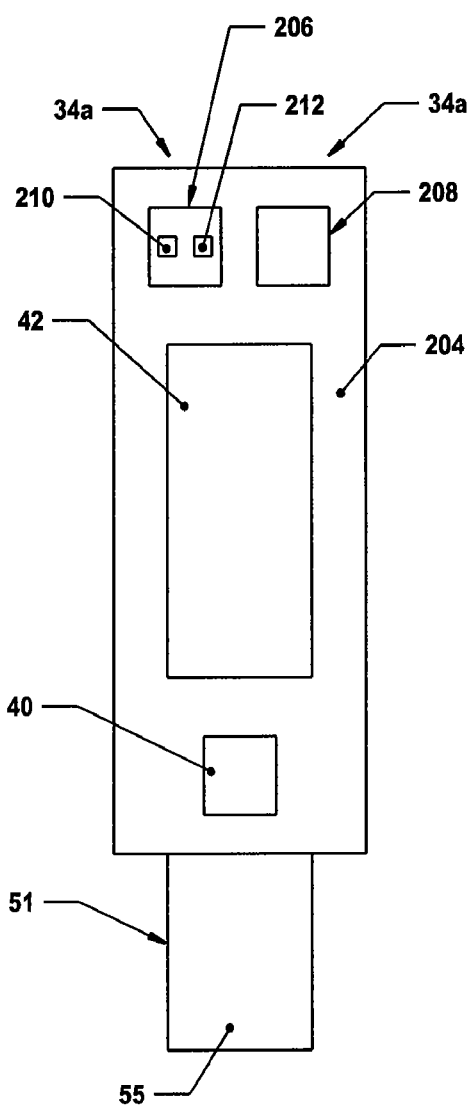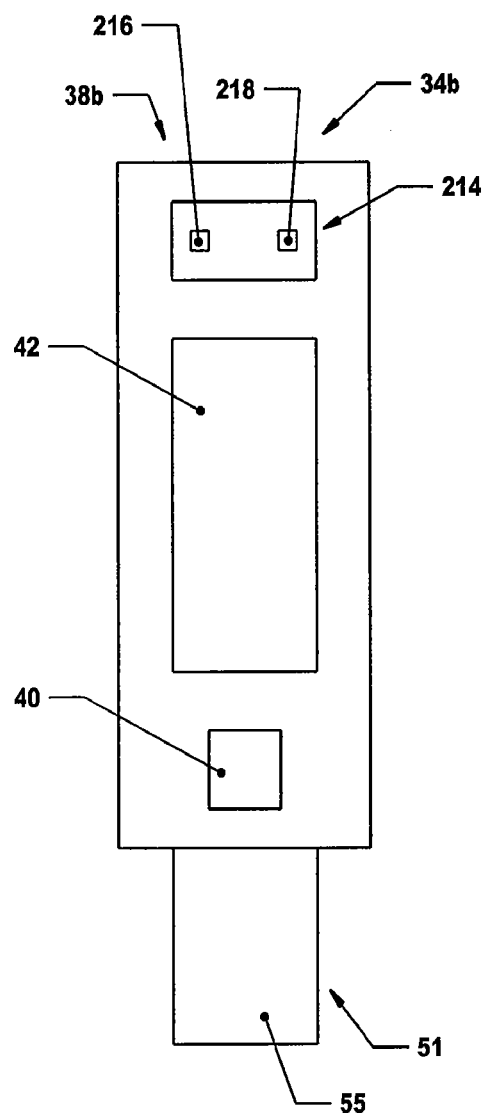
FIG 11   FIG 12

DATA HOLDER, SYSTEM AND METHOD

CROSS-REFERENCE

This application claims the benefit under 35 U.S.C. §119 (e) of U.S. Provisional Application Ser. No. 61/111,725, filed Nov. 5, 2008, and U.S. Provisional Application Ser. No. 61/218,942, filed Jun. 20, 2009, the entirety of each which is expressly incorporated by reference herein.

FIELD

The present invention relates to a data holder that is attachable to a machine or apparatus, an apparatus or a component therefor and more particularly to a data holder, system and method for retaining machine or apparatus related data in a secured manner.

BACKGROUND

In the past, blueprints and other data related to machines and apparatuses was typically provided in paper form or on a CD-ROM that was shipped with the machine or apparatus. This required a person to keep track of the location of this material and to find it when needed. Unfortunately, this information was often lost or very difficult and time-consuming to find resulting in lost time as well as calls to the manufacturer, supplier or distributor of the machine or apparatus to have them replace the lost information.

What is needed is a device, system and method for helping to ensure such data related to a particular machine or apparatus remains associated with the machine or apparatus and is easily and conveniently accessible.

SUMMARY

The present invention is directed to a data vault, system and method for helping to ensure data related to a particular machine or apparatus remains associated with the machine or apparatus and is conveniently and easily accessible when needed. The data vault includes a ruggedized casing having a receptacle formed in it that receives an electronic module equipped with onboard memory and which can be equipped with a processor. A cover is attached to the casing and movable between a closed position where the cover encloses the receptacle and protects the module received in the receptacle in a manner that provides a seal preventing dirt, debris, solvents and the like from getting into the receptacle and contacting the electronic module.

In one preferred embodiment, a sealing arrangement is provided that fluid tightly and/or air tightly seals the receptacle when the cover is closed. One sealing arrangement includes an elastomeric sealing plate with an outwardly extending sealing bead attached by a mount that can be a plate to the cover and which seats in the receptacle. The receptacle can have a seal bead receiving seat formed therein that helps facilitate sealing.

The cover is pivotally connected to the casing and includes a fascinating arrangement that enables the cover to be releasably, yet positively secured to the casing. Both the cover and the casing are made of a durable, tough and resilient material, such as aluminum, capable of providing radio frequency interference suppression and/or electromagnetic suppression. In a preferred embodiment, the casing is machined of a single blank producing a casing of one-piece, unitary, and substantially homogeneous construction.

The casing is configured to permit mounting to part of a machine or apparatus, such as a component thereof, in a manner that protectively secures the casing and hence the vault to the machine or apparatus. The vault can include a unique identifier, such as visually perceptible indicia, unique to the vault that enables data held by the electronic module to be associated with the particular machine or apparatus to which the vault is mounted. In one embodiment, indicia as applied to a plate attached to an outer viewable surface of the casing and can overlie a label of tamperproof construction that covers fastener is used to attach the casing to the machine or apparatus.

The electronic module includes onboard memory, such as flash memory or in other type of memory able to retain its memory in the absence of electrical power. The electronic module can include a processor and includes an interface enabling connection via a link to a processor equipped device, such as a computer, a PDA, a handheld mobile device, or the like enabling data stored in the electronic module memory that is associated with the machine or apparatus to which the vault containing the module is attached to be backed up, including to a remotely located storage device. Such an electronic module can be configured to include one or more onboard electronic modules, such as for power generation and/or storage, wireless communication with the processor-equipped device via wireless link, as well as for counting cycles, such as molding cycles, stamping cycles and/or thermal cycles.

In one preferred embodiment, the electronic module is configured with a drive, such as a USB drive or a flash drive, on which an executable program is stored that can be read and executed by the processor equipped device to facilitate backing up of data to the processor equipped device as well as backing up of data to a remotely located data storage unit, such as a data storage server or Web server. In addition, such an executable program stored onboard the electronic module can be configured to enable either the processor equipped device or the data storage server to perform data synchronization, to further backed up additional data that has accumulated and/or recently been stored in memory of the module.

Other advantages, benefits and features of the present invention will become apparent to those skilled in the art upon reading the detailed description and viewing the related drawings.

DRAWING DESCRIPTION

One or more preferred exemplary embodiments of the invention are illustrated in the accompanying drawings in which like reference numerals represent like parts throughout and in which:

FIG. 10 is a perspective view of another machine or apparatus that is a set of stamping dies with a data holder constructed in accordance with the present invention attached to one of the guys;

FIG. 11 is a schematic diagram of one preferred embodiment of an electronic module that is receivable in a casing of the data holder;

FIG. 12 is a schematic diagram of another preferred embodiment of an electronic module that is receivable in a casing of the data holder;

Figure 13:
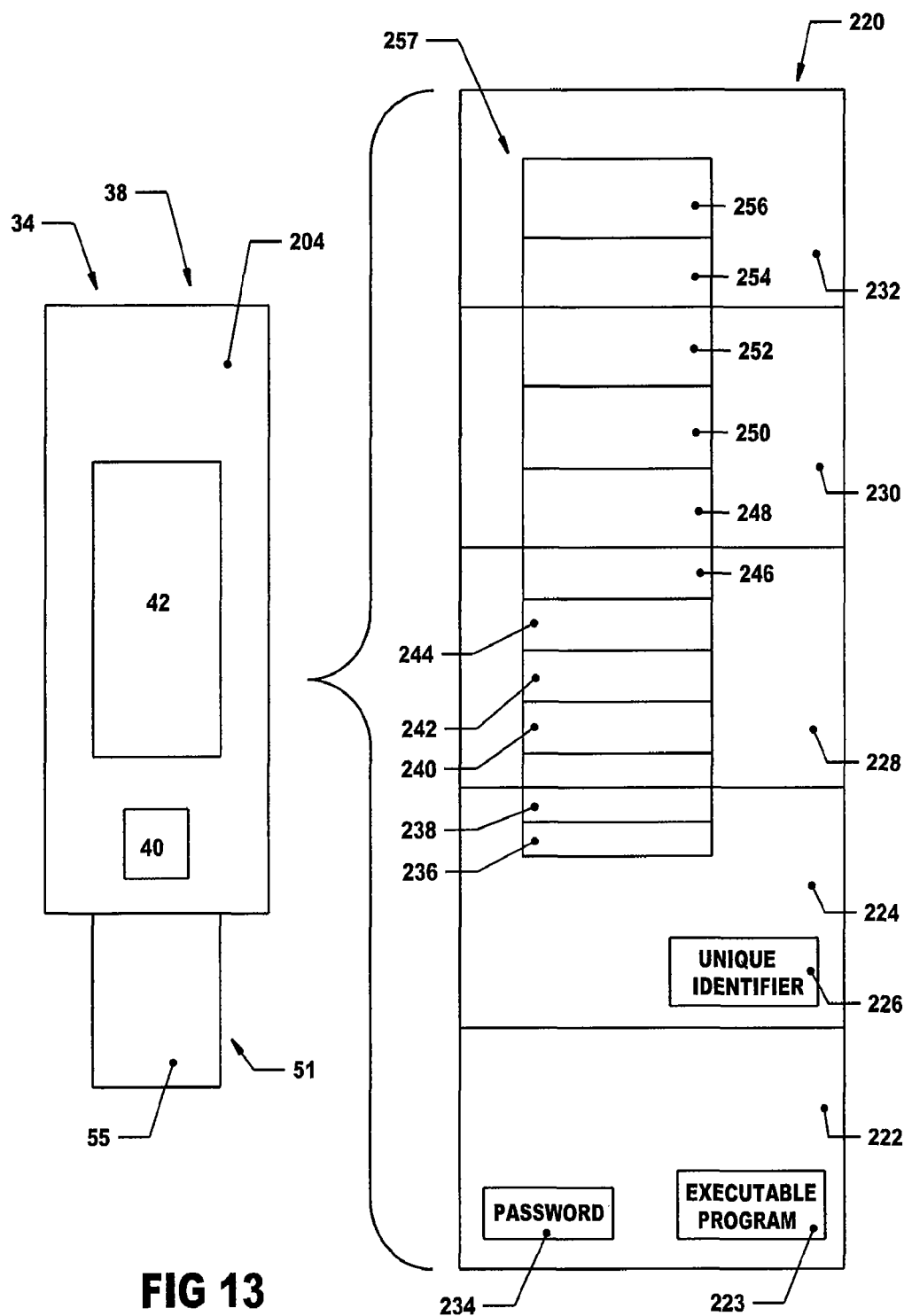
Figure 14:
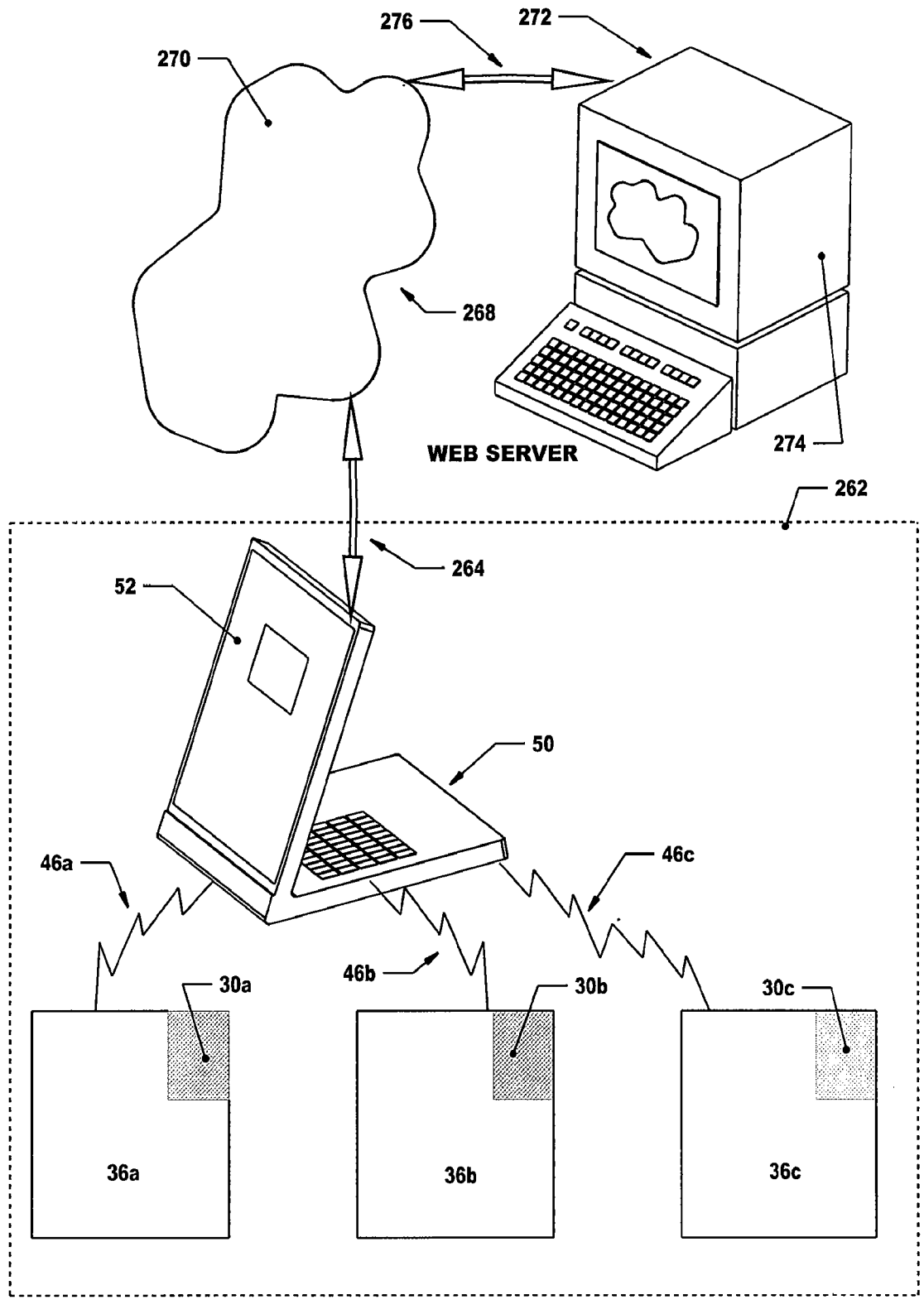

FIG. 13 is a schematic diagram of an electronic module receivable in the casing of a data holder along with a memory block diagram depicting digital data capable of being stored in the memory onboard the electronic module; and FIG. 14 is a schematic view of a system and illustrating a method employing a plurality of data holders each mounted to a particular machine or apparatus and uniquely associated therewith enabling back up of stored data to a processor equipped device as well as to a remotely located backup storage unit.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIGS. 1-4 illustrates an electrical device and data protecting vault assembly 30 that includes a protective data holder 32 that houses an electronic device 34 with the vault 30 being mountable to a machine or apparatus 36 (FIGS. 7 and 8) with the electronic device 34 configured to hold digital data pertaining to the machine or apparatus 36. With additional reference to FIGS. 7 and 8, the electronic device 34 is an electronic module 38 that includes a processor 40, memory 42, and an interface 44 that is connectable to via a link 46, such as a cable 48, to another processor-equipped electronic device 50, such as a computer 52. In the preferred embodiment shown in FIGS. 7 and 8, the cable 48 is an electrical cable with a computer connector 49 connected to a computer connector 51 of the interface 44. One such computer connector is a USB male connector 53 (FIGS. 7 and 8) that is releasably engageable with a female USB connector 55 (FIG. 4) onboard the electronic module 38.

Figure 4:
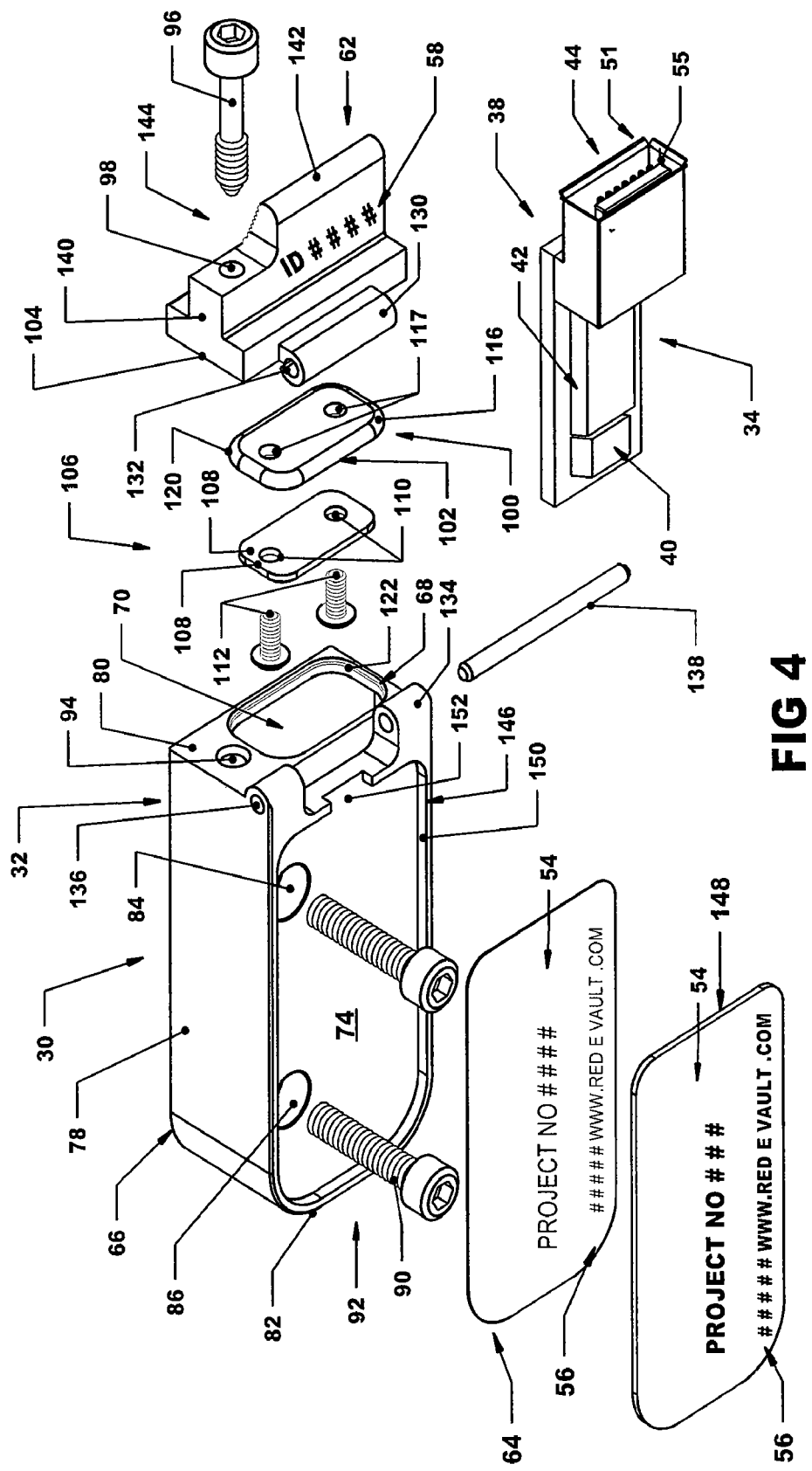
FIG. 4 is a perspective exploded view of the data holder.
Figure 5:
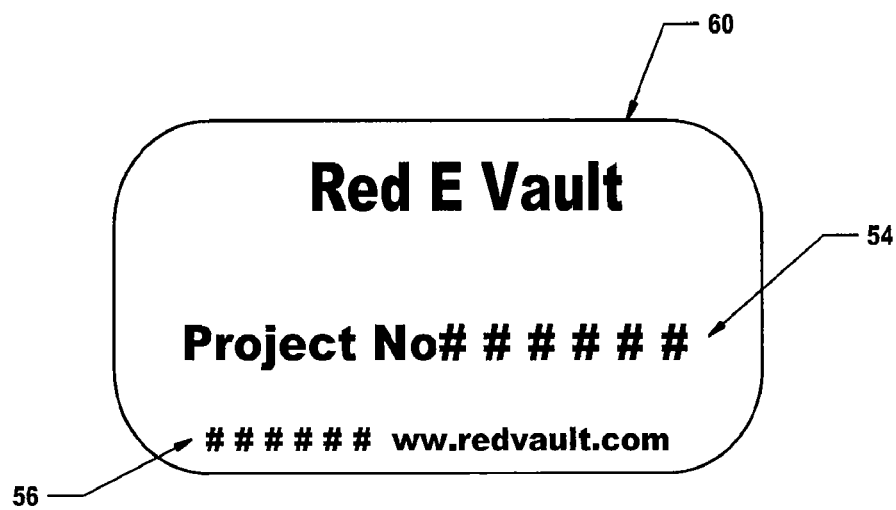
FIG. 5 is a top plan view of an outer cover having a plurality of unique identifiers in the form of visually perceptible indicia.
Figure 6:
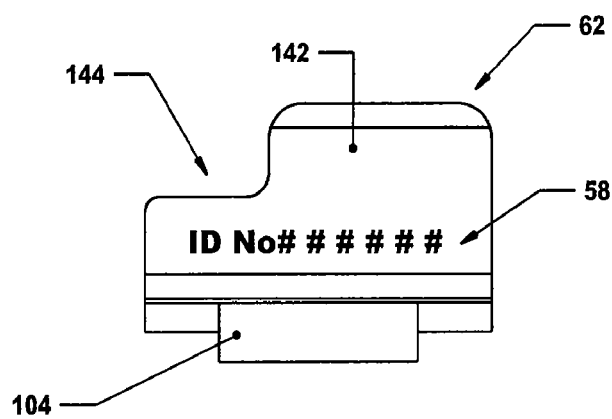
FIG. 6 is an elevation view of a portion of the cover with a unique identifier in the form of a further visually perceptible indicia shown thereon.

With reference to FIGS. 5 and 6, and electrical device and data protecting vault 30 constructed in accordance with the present invention can include one or more identifiers, such as visually perceptible indicia 54, 56 and 58, uniquely associated with the vault 30 pertaining to the machine or apparatus 36 to which the vault 30 is mounted and/or pertaining to digital data stored on the electronic module 38. For example, as is shown in FIG. 5, the data holder 32 can be equipped with a plate 60 which has one or more visually perceptible indicia, such as a project number 52, e.g., "#####", and/or a serial number 54, e.g., "#####-#####-#", shown thereon. With reference to FIG. 4, such visually perceptible indicia can be provided on a label 64 that can be of tamper-proof construction, which can be adhesively applied on part of the protective data holder 32. If desired, one or more unique identifiers, such as identification number 56, e.g., "ID #####" can be provided in another location, such as directly on part of the data holder 32. For example, as is shown in FIG. 6, identification number 56 is printed directly on a cover 62 of the data holder 32.

The protective data holder 32 includes a casing 66 that has an opening 68 that communicates with a receptacle 70 formed in it that receives the electronic module 38 with the receptacle 70 configured to enable the module 38 to be oriented with its interface 44 disposed in or adjacent the opening 68. In a currently preferred embodiment, the casing 66 is of one-piece, unitary and substantially homogeneous construction with opening 68 and receptacle 70 integrally formed therein. For example, in one preferred embodiment, the casing 66 machined, such as by wire EDM or ECM machining, of aluminum to form its shape and features including opening 68 and cavity 70. Such a casing construction advantageously helps provide magnetic field and electric field shielding providing data protection to data stored in the electronic module 38. Such a casing construction also helps produce a protective data holder 32 that is strong and tough such that it physically protects an electronic module 38 received in the cavity 70 in the casing 66.

Figure 1:
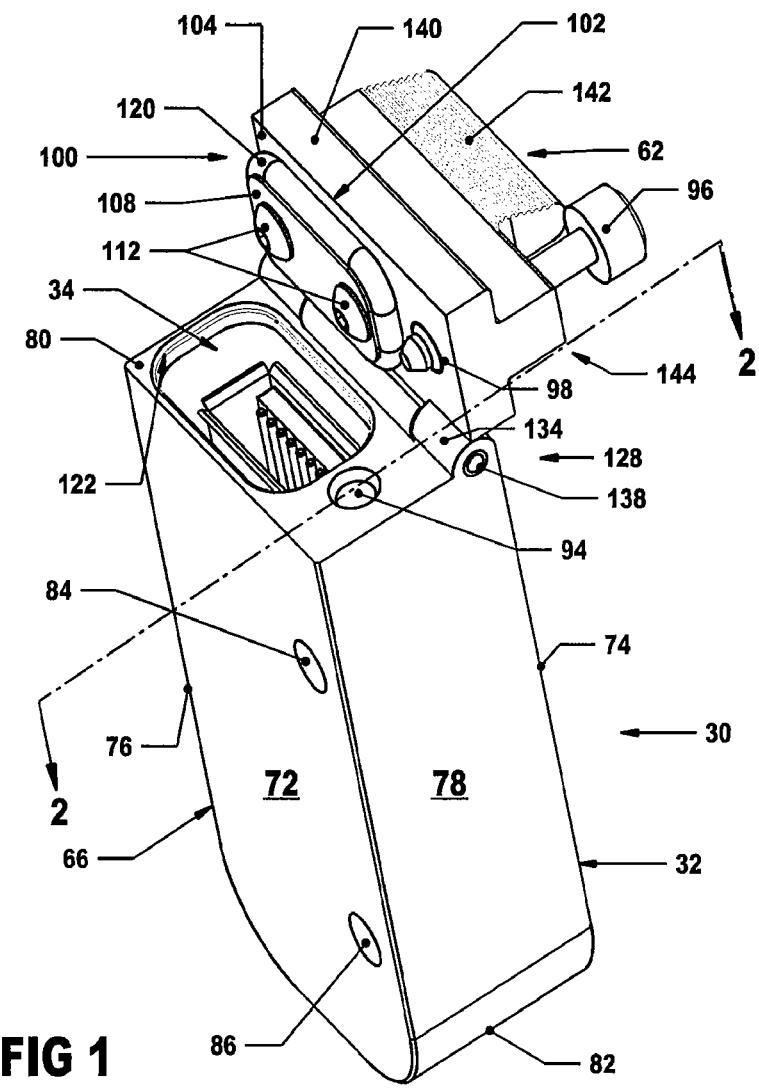
FIG. 1 is a perspective view of a preferred embodiment of a protective data holder constructed in accordance with the present invention.
Figure 2:
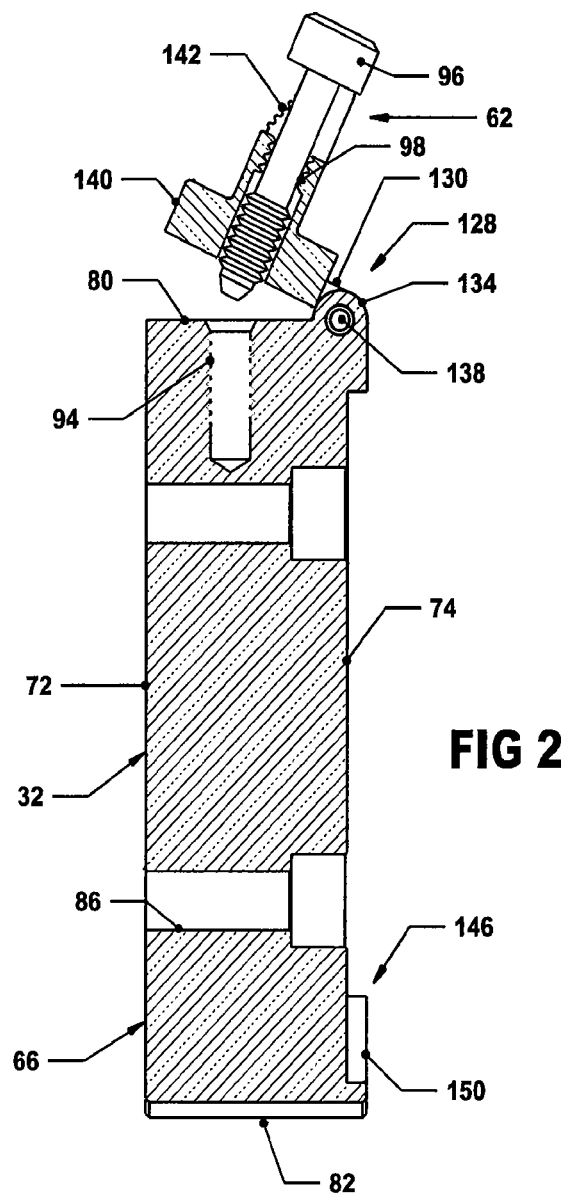
FIG. 2 is an elevation cross sectional view of the data holder taken along lines 2-2 of FIG. 1.

With continued reference to FIGS. 1-4, the casing 66 can be generally elongate with the cavity 70 formed in it also being elongate so as to accommodate an elongate electronic module 38. The casing 66 has a rear wall 72 (FIG. 1), a front wall 74 (FIG. 4), a pair of side walls 76, 78, and a pair of end walls 80, 82, one of which has opening 68 formed therein. As is best shown in FIGS. 1, 2 and 4, sidewall 78 has a thickness sufficient to accommodate a plurality of spaced apart through-bores 84, 86 that extend generally transversely to a longitudinal axis of the electronic module receiving receptacle 70 enabling a corresponding plurality of fasteners 88, 90, such as threaded bolts, of a mounting arrangement 92 to be received in a corresponding through-bore 84, 86 in mounting the protective data holder 32 to machine or apparatus 36. Although not shown, each one of the threaded fasteners 88, 90 is received in a corresponding threaded bore in the machine or apparatus 36 to which the casing 66 is mounted.

To help produce a protective data holder 32 that is of compact construction, the electronic module receiving receptacle 70 can be offset towards one of the side walls 76 resulting in a margin along the other one of the sidewall 78 of greater thickness that is sufficient to accommodate through-bores 84, 86 without the bores 84, 86 intruding into receptacle 70. Such an arrangement helps ensure that the casing 66 provides a protective receptacle 70 that is sealed when the cover 62 is closed preventing dirt, debris, oil, and the like from entering the receptacle 70.

Figure 3:
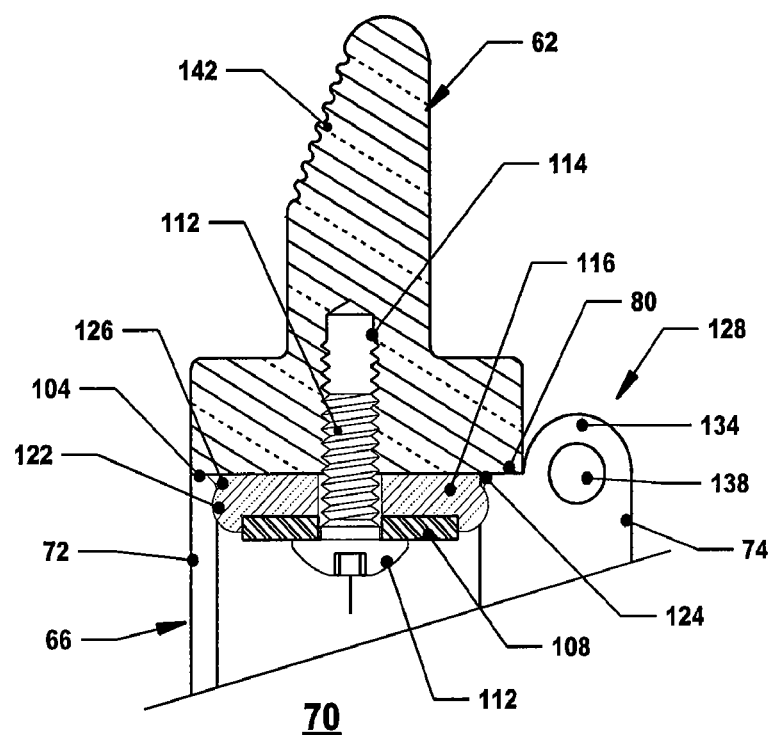
FIG. 3 is a partial fragmentary cross-sectional view of a portion of the cover of the data holder disposed in a closed position.

Such an offset receptacle 70 enables a threaded bore 94 to be formed in the top wall of the casing 66 for receiving a threaded fastener 96 that extends through a bore 98 in the cover 62 enabling the cover 62 to be secured in a closed position, such as depicted in FIG. 3, covering receptacle opening 68. In a preferred embodiment, the threaded fastener 96 is a thumbscrew or the like that is configured for enabling manual tightening during cover closure and manual loosening when seeking to disengage the cover 62 when opening the cover.

The cover 62 is provided with a sealing arrangement 100 that provides a seal when the cover 62 is disposed in the closed position helping to prevent dirt, debris, oil and the like from entering the receptacle 70 and damaging the electronic module 38. In a preferred embodiment, the sealing arrangement 100 is configured to fluid tightly seal the receptacle 70 when the cover 62 is closed. In another preferred embodiment, the sealing arrangement 100 is configured to air tightly seal the receptacle 70 when the cover 62 is closed.

The sealing arrangement 100 includes a seal 102 secured to a casing mating surface 104 of the cover 62 by a seal holder 106. The seal holder 106 includes a seal holding plate 108 having a pair of bores 110 therethrough that each receives a threaded fastener 112 used to attach the plate 108 to the cover 62. As is shown in FIG. 3, each threaded fastener 112 is received in a threaded bore 114 formed in the casing mating surface 104 of the cover 62.

As is best shown in FIGS. 3 and 4, the seal 102 is a resilient plate 116 with bores 117 in it that accommodate fasteners 112. The seal plate 116 can be of elastomeric construction and includes a generally outwardly radiused sealing bead 120 received in a corresponding generally complementarily contoured seal seat 122 formed in the casing 66 about the periphery of the receptacle opening 68. When the cover 62 is closed, each sealing bead 120 is at least partially received in a corresponding seal seat 122 helping produce a more positive seal. As is depicted in FIG. 3, as the cover securing fastener 96 is tightened when the cover 62 is disposed in the closed position, at least a portion of the bead 120 of the seal plate 116 is urged into tight sealing contact with a chamfered surface 124 of a sealing lip 126 of seal seat 122 helping to produce a more positive seal. As the cover securing fastener is tightened, compression of the seal between the cover 62 and casing top wall 80 along or adjacent seal seat 122 can occur which can further improve sealing.

The cover 62 is attached to the casing 66 by a hinge arrangement 128 that includes an arm 130 with a cylindrical journal 132 defining a hinge knuckle that is received between a pair of spaced apart arms 134 integrally formed of the casing 66 that each include a respective cylindrical journal 136 also defining hinge knuckles. When the journals 132, 136 are aligned, a pivot pin 138 is inserted through the journals 132, 136 pivotably attaching the cover 62 to the casing 66. The hinge arrangement 128 is configured so as to enable the cover 62 to pivot outwardly during opening away from the machine or apparatus 36 to which the casing 66 is attached.

Cover 62 has a base 140 with a thumb grip 142 extending outwardly from the base 140 enabling a user to engage the thumb grip 142 to urge the cover 62 between the closed position and an open position disposed from the closed position when fastener 96 is disengaged from casing 66. The thumb grip 142 has a recess 144 that provides access to enable manual grasping of fastener 96 to either engage it with the casing 66 when securing the cover 62 to the casing 66 and enclosing the cover 62 or to disengage the fastener 96 from the casing 66 when opening the cover 62.

The front wall 74 can include a pocket 146 formed therein in which the label 64 and/or plate 60 (FIG. 5) can be received. In one embodiment, such as depicted in FIG. 4, an outer layer 148, such as a transparent sheet or the like, can be disposed on top of the label 64, such as to help protect the label 64.

In assembly, label 64 and/or plate 60 overlies fasteners 88, 90 after the fasteners 88, 90 are used to attach the casing 66 to the machine or apparatus 36. With the label 64 and/or plate 60 overlying the fasteners 88, 90, the fasteners 88, 90 are hidden from view. In one preferred embodiment, label 64 and/or plate 60 is of tamperproof construction thereby helping to ensure integrity of the vault assembly 30. For example, where attached to a particular machine or apparatus 36 and containing data specific to that particular machine or apparatus 36, such a tamperproof label 64 and or plate 60 arrangement will make it apparent should tampering occur.

In another embodiment, the pocket 146 is defined by an upraised lip 150 encompassing the periphery of the pocket 146 with the lip 150 having an interruption 152 therein permitting label 64 and/or plate 60 removal, such as upon rotation of the cover 62 to a particular position or removal of the cover 62 from the casing 66. Lip 150 is configured to provide a snap fit or interference fit with label 64, plate 60, and/or outer layer 148 thereby retaining the label 64 plate 60 and/or outer layer 148 in the pocket 146 once inserted into the pocket 146.

Figure 7:
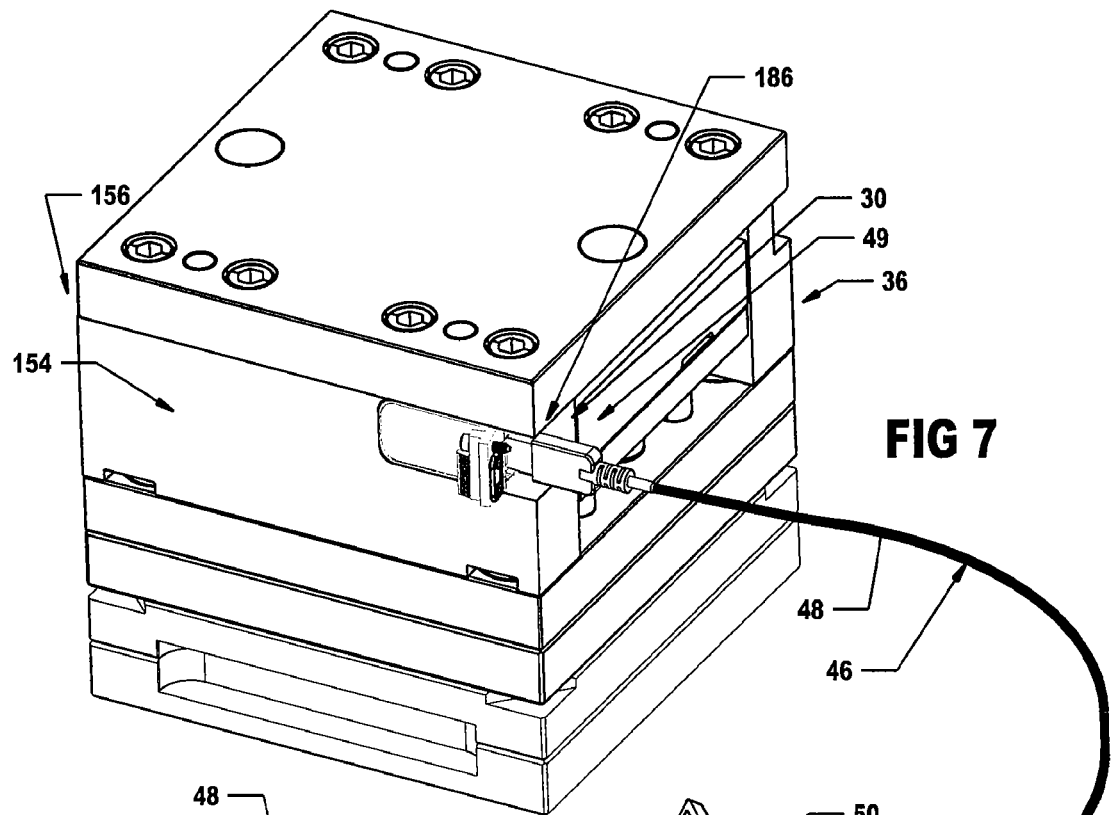
FIG. 7 is a perspective view of a data holder connected by a cable link to a computer enabling data transfer therebetween.
Figure 8:
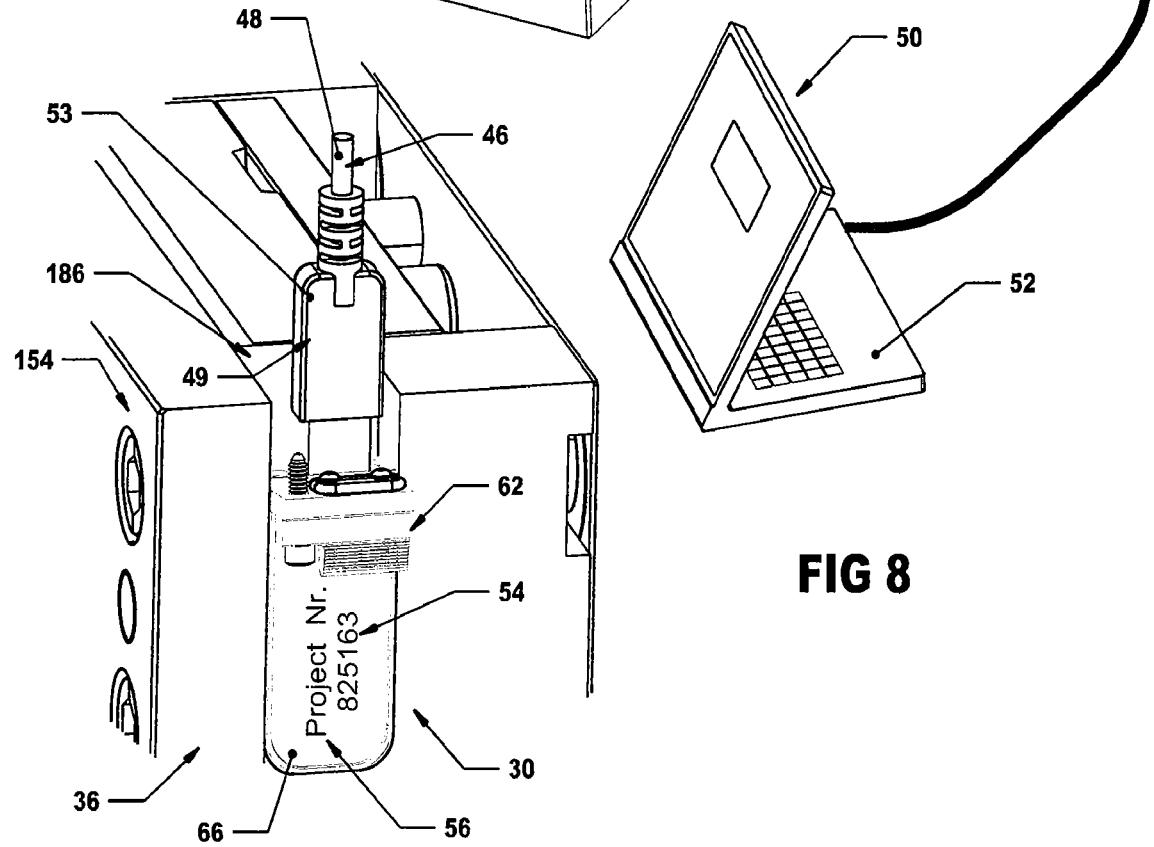
FIG. 8 is a fragmentary perspective view of the data holder with its cover an open position illustrating a connector of the cable plugged into a complementary connector of the electronic memory containing module disposed in the data holder.
Figure 9:
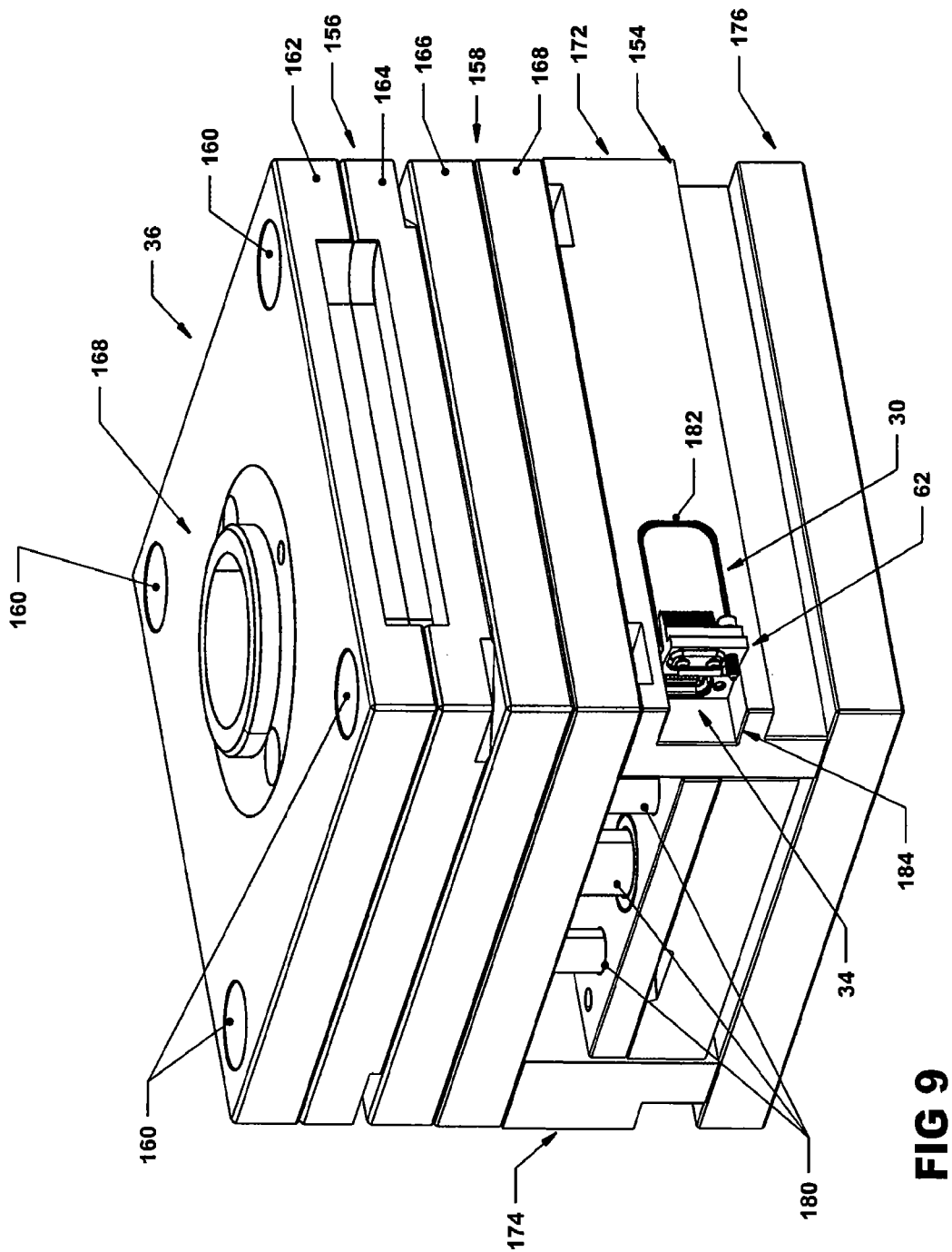
FIG. 9 is a perspective view of a machine or apparatus that is a plastic injection molding machine with the data holder mounted in a pocket in a side plate of the molding machine.

One machine or apparatus 36 with which the data protecting vault assembly 30 is particularly well suited for use is a plastic injection molding machine 154, such as depicted in FIGS. 7-9. With specific reference to FIG. 9, the molding machine 154 has an upper mold half 156 that cooperates with a lower mold half 158 with one or both of the mold halves 156, 158 having or carrying a cavity (not shown) in which a moldable material, such as plastic, is injected. Opening and closing of one mold half 156 relative to the other mold half 158 during each molding cycle is guided by a plurality of pairs of posts (not shown), each of which is guided in a corresponding bore 160.

Each mold half 156, 158 can be respectively formed of a plurality of mold plates 162, 164, 166 and 168. Such plates 162-168, for example, can include a top plate 162, a stripper plate 164, a cavity plate 166, and a core plate 168. The top plate 162 includes an upper sprue or opening 170. Below the lower mold half 158 are a pair of spaced part side plates 172, 174 that are disposed on a lower mold plate 176. Between the side plates 172, 174 is an ejector plate 178 that is guided up and down during molding by a plurality of ejector plate guide cylinders 180.

The vault 30 is disposed in a pocket 182 formed in one of the side plates 172. The pocket 182 can be an elongate channel as is shown in FIG. 9 and can extend to one end 184 of the side plate 172 providing clearance to open and close the cover 62. The pocket opening 184 can facilitate insertion of the vault 30 in the pocket 182 and also makes it easy to access the electronic module 34 inside the casing 66 when the vault cover 62 is opened. Mounting the vault 30 in this location is advantageous as it facilitates easy access to the electronic module 34 in the vault 30. Mounting the vault 30 to one of the side plates 172 is also advantageous by helping to reduce the vibration and shock loads to which the vault 30 and the electronic module 34 are subjected.

Referring once again to FIGS. 7 and 8, the vault 30 can be mounted in a pocket 186 in a plate of an upper mold half 156. In each case, pocket 182 or 186 is configured so that the outer surface of the casing 66 of the vault 30 is substantially flush with an outer surface the plate of the mold machine 154 in which the pocket is disposed. The outer surface of the casing 66 includes one or more indicia thereon, e.g., 54, 56, such as depicted in FIGS. 7 and 8 thereby ensuring it is visually perceptible to anyone walking by or standing adjacent the vault 30. In a preferred embodiment, the vault 30 is mounted to the upper mold half 156 during or upon manufacture with data relating to the upper mold half 156, such as cavity configuration data, cavity print(s), temperature data, etc. stored on the electronic module 38. The vault 30 then remains attached to the upper mold half 156 during shipment as well as during use and operation of the upper mold half 156 in a plastic injection mold, such as mold 156.

Such an electronic device and data protecting vault assembly 30 is also well suited for use with other types of machines and apparatuses, particularly those that typically require a great deal of data to be stored about the machine, apparatus, or a component therefor. For example, with reference to FIG. 10, vault 30 is shown attached to part of another machine or apparatus 36' portion that is a set of stamping dies 188 having a set of stamping die plates 190, 192 movable relative to one another on a plurality of guides 194. One of the stamping die plates 192 can include a pair of outwardly extending mounts 196, such as is shown in FIG. 10 enabling releasable mounting in a stamping press or the like. One of the stamping die plates 192 can be configured with a recess 198 or pocket formed therein in which the vault 30 is mounted, such as is depicted in FIG. 10.

In a preferred embodiment, vault 30 is attached to one of the stamping die plates during, upon or after manufacture and contains data relating to the stamping pattern 200, such as a three dimensionally contoured opposed die plate surface, formed or otherwise configured in one or both plates 190, 192. Such data can include CAD/CAM drawing files, setup data, maintenance data, cycling data, and the like. As previously discussed, vault 30 preferably remains attached to one of the stamping die plates 192 during shipping, assembly to a stamping press, and during use in the press.

FIG. 11 illustrates one embodiment of an electronic device 34a that is receivable in the casing 66 of vault 30 that is an electronic module 38a that is or otherwise includes a flash drive 202, such as a USB flash drive having a USB connector 55. As previously discussed regarding the module 38 shown in FIG. 4, module 38a includes a circuit board 204 or the like to which a plurality of electrical components is attached on one or both sides. Circuit board 204 includes a processor 40 and memory 42 that preferably is flash memory or another type of memory that retains its data in the absence of electrical power. The amount of onboard memory 42 is sufficient for the amount of data relating to the machine or apparatus 36 to which a vault 30 housing module 38a is attached. In one preferred embodiment, the amount of onboard memory 42 is at least 2 GB. In another preferred embodiment, the amount of onboard memory 42 can range between 2 GB and 256 GB. Processor 40 can be a microprocessor or microcontroller and can include an FPGA or be connected to an onboard FPGA if desired.

The module 38a also can be configured with a plurality of other components, such as a power module 206 and a wireless communications module 208. Power module 206 can include a source of power, such as a battery. In another preferred embodiment, the power module 206 includes an energy transducer 210 that can be of photovoltaic, thermoelectric, piezoelectric, inductive or radio frequency construction coupled to a battery 212, such as a thin-film battery, a high-capacity storage capacitor, e.g. ultracapacitor, or another type of electrical energy storage unit.

An example of a suitable power module 206 that can be employed is a zero power wireless sensor arrangement using an energy conversion transducer, e.g. transducer 210, tied to an integrated rechargeable power storage device, e.g., power storage device 212, that provides electrical power to a wireless link or transceiver length of communications module 208 that can provide RF, optical or infrared wireless signals. As a result, wireless transfer of digital data stored in memory 42 can be done via a wireless link between module 38a and processor-equipped electronic device, such as computer 52 (FIG. 7) via a wireless link between communications module 208 and computer 52. In addition, computer 52 can be connected via cable link 46, such as in the manner depicted in FIG. 7.

FIG. 12 illustrates another embodiment of an electronic module 38b having an onboard processor 40 as well as onboard memory 42. In addition, while also being configurable with one or both modules 206 and 208 of electronics module 38a, electronics module 38b includes an onboard sensor arrangement 214 having one or more sensors 216, 218 configured to detect apparatus cycling, such as to provide mold cycle count when the module 38b is used in a data vault 30 used with a forming machine, such as a plastics injection molding machine 156, or used in a data vault 30 mounted to part of a press, such as stamping die arrangement 188. In another preferred implementation, one or more sensors 216, 218 of sensor arrangement 214 is a heat sensor enabling a thermal cycle count to be obtained. Each such sensor 216 and/or 218 of such a sensor arrangement 215 onboard electronic module 38b can communicate with processor 40 and/or memory 42 enabling cycle count, e.g., mold cycle count, stamping press cycle count, or thermal cycle count, to be stored in memory 42 and uploaded to an electronics device, such as computer 52 (FIG. 7) via cable link 46 or a wireless link.

FIG. 13 generally schematically depicts a memory block diagram 220 illustrating how the onboard memory 42 can be allocated and implementing a machine or apparatus data holding system and method in accordance with the present invention. Memory block diagram 220 can be illustrative of a memory stack or contents of memory 42 arranged or configured in a manner other than depicted in diagram 220. At least one portion 222 of the onboard memory 42 can be loaded, e.g. preloaded, with digital information configured in the form of a program 223, such as a network installable, e.g. ".msi", software package or program, or an executable, e.g., ".exe", program readable by a processor-equipped device, such as computer 52, when it is linked to the electronic module 38, such as via its USB interface 51.

In one preferred implementation, memory portion or block 222 is configured with such a program 223 that can be configured to automatically run when module 38 is linked to an electronic device, e.g., computer 52, which does not have the program 223 already installed. In one preferred implementation, the electronic module 38 is or includes a flash drive, such as a USB flash drive, equipped with a bootable partition, e.g. all or part of memory portion/block 222, which automatically is read and executed when the module 38 is linked to an electronic device, such as computer 52, configured with a conventional operating system, such as MICROSOFT WINDOWS XP, MICROSOFT WINDOWS VISTA, MICROSOFT WINDOWS 7, Linux, a mobile device operating system, such as WINDOWS CE or the like, or another operating system capable of automatically reading and running such a program 223 stored onboard memory 42 of electronics module 38.

Startup program 223 can be a shell or menu program capable of selecting other programs stored on memory 42 and can be configured to detect when a device, e.g. computer 52, has linked for the first time with the module 38 to cause it to download to the linked electronic device, e.g. computer 52 and run startup program 223 or another program stored in memory 42 to install a particular software program or software package on the linked device, e.g. computer 52. After that, each time the device, e.g. computer 52, links to module 38, the software program or package that was installed upon first link up with module 38 is automatically executed. In another preferred implementation, each time the device, e.g.

computer 52, links to module 38 a program, such as startup program 223 is automatically loaded and executed by the device, e.g. computer 52.

Memory portion/block 222 or another memory portion or block, such as memory portion or block 224 is configured with its own unique identifier 226 stored in digital format in memory 42 that corresponds one or more unique identifiers 54, 56, and/or 58 enabling the unique identifier 226 to be used by a software package or program, such as program 223, including in a database, to associate other data, including data onboard memory 42 and data being downloaded via linked computer 52 to the memory 42, which relates to the machine or apparatus 36 to which the vault 30 holding electronics module 38 is mounted. This enables the unique identifier 226 to be used to associate such data relating to the machine or apparatus 36 to which the vault 30 is mounted with that specific machine or apparatus as well as to associate data, including the same data stored in memory 42, relating to the machine or apparatus 36 to which vault 30 is mounted that is stored elsewhere off board electronics module 38. As is discussed in more detail below, such data associated with the unique identifier 226 of a particular machine or apparatus 36 can be stored in a database or the like in an electronic device, such as computer 52 or a server, which is part of a network and which can be remotely located from the location of the machine or apparatus 36. An example of such a remotely located server is a Web server connected to the Internet.

One or more of the memory portions/blocks 222, 224 or another block, such as 228, 230, and/or 232 can be used to hold a password 234 that provides password protection for the data stored onboard module 38 pertaining to the machine or apparatus 36 to which the vault 30 holding the module 38 is attached. Another program, such as a software utility or the like, requiring entry of the password 234 in order to access data stored in memory 42 on module 38 can be included as part of the startup program 223 on the module 38 and can be configured to automatically run on a device, e.g., computer 52, linking with the module 38 upon linking. Such a program can also be configured to enable first-time user password set up upon initial linking by a device, e.g. computer 52, with the module 38.

One or more of the memory portions/blocks 224-232 is configured to hold data specific to the machine or apparatus 36 to which the vault 30 is attached is configured to include, for example, print data 236, such as CAD/CAM prints of a die, a stamp, a mold, or other component of machine or apparatus 36, set up data 238, such as mold or stamping die set up data, component and materials specifications 240, a bill of materials 242 relating to the machine or apparatus 36 or one or more components therefore, part pictures 244 of components of the machine or apparatus 36, contacts 246 including manufacturer website, address and telephone information relating to the builder, distributor, installer, service firm or the like, repair history data 248, operations related data 250 such as cycle count and/or thermal data, warranty information 252, data logs 254, such as operational and quality control logs, as well as other data 256 related to the machine or apparatus 36. Such an arrangement of data stored in memory 42 can be in the form of a database 257

FIG. 14 illustrates a schematic diagram 258 of use and operation of a system 260 capable of being used with one or more machines or apparatuses 36a, 36b, and 36c in a particular facility 262 that are each equipped with a vault assembly 30a, 30b, and 30c that each protectively houses an electronic module 38 connectable via a link 46a, 46b and 46c to a processor-equipped electronic device 50, such as a notebook computer 52, a handheld PDA, a cellular phone, or another processor equipped device. As previously discussed, a software program, such as startup program(s) 223 stored in module 38 of each vault 30a, 30b, and 30c can be configured to upload data, e.g., data 236-256, from the memory 42 onto the electronic device 50, e.g. computer 52, where it can be stored to provide a redundant backup of the data. Each such set of data, e.g. data 236-256, is associated using its unique identifier 226 in a database in memory of the electronic device 50, e.g., computer 52, so that the uploaded data, e.g., data 236-256, remains associated in the database with the particular machine or apparatus 36a, 36b, and 36c to which the particular vault 30a, 30b, 30c is attached. Bidirectional data transfer is contemplated to enable data from the electronic device 50, e.g., computer 52, to be downloaded, such as via link 46, and stored in memory 42 of the module 38 protectively housed in vault 30 attached to machine or apparatus 36 having the unique identifier with which the downloaded data will be associated forth with.

Device 50, such as computer 52, can be connected, such as via a link 264, to a network 268, such as the Internet 270, to upload the data associated which each one of the machines or apparatuses 36a, 36b and 36c it had downloaded from the respective vault 30a, 30b, and 30c, to a remotely located processor-equipped device 272, such as a data storage server 274, via a link 274, such as a network or Internet link. Data storage server 274 can be a Web server as is indicated in FIG. 14. In another preferred implementation, the network is disposed on site in the facility 262 or remotely connects storage server 274 located at a data storage facility remote from facility 262.

Software program 223 can be configured, when executed by electronic device 50, e.g. computer 52, to synchronize data stored in each vault 30a, 30b, and/or 30c with the data stored onboard the device 50 and/or at the storage server 274 with such data synchronization performed each time the device 50 links with each vault 30a, 30b, and/or 30c. In addition, where the electronic module 38 of each vault 30a, 30b and/or 30c is configured for wireless communication, data storage server 274 maybe configured to link directly to each vault 30a, 30b and/or 30c via a wireless router (not shown) or the like disposed in the facility 262 and connected via network 268, such as via the Internet 270, to storage server 274 enabling data onboard each vault 30a, 30b and/or 30c to be uploaded and/or synchronized as needed or desired.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A protective data holder for mounting to a machine or apparatus comprising:
   (a) an electronic module comprised of an onboard processor, a link, and an onboard memory in which is stored: (i) machine or apparatus setup, drawing, or operations related data related to at least a portion of the machine or apparatus to which the protective data holder is mounted, (ii) data comprising an identifier unique to the protective data holder that is associated with the machine or apparatus to which the protective data holder is mounted, and (iii) a software program readable and executable by a processor-equipped electronic device connected via the link to the electronic module, the software program transferring data related to the machine or apparatus to which the protective data holder is mounted that is stored in the onboard memory from the electronic module to the processor-equipped electronic device when the software program read by the processor-equipped device is executed by the processor-equipped device; and (b) a protective housing in which the electronic module is disposed and configured for mounting to the machine or apparatus; and wherein the protective housing comprises a casing of one-piece and unitary construction and a cover movable between a closed position preventing access to the electronic module and an open position disposed from the closed position permitting access to the electronic module and, wherein the casing has an elongate receptacle that receives the electronic module formed by a front wall, a rear wall, a pair of sidewalls, and a pair of end walls with an opening of the receptacle formed in one of the end walls, and wherein at least one of the sidewalls has a thickness sufficient to accommodate at least one fastener extending through the front wall, the at least one of the sidewalls, and the rear wall alongside but not through the receptacle in mounting the casing to the machine or apparatus that also provides a cover anchoring surface of the one of the end walls alongside the opening that is engaged by the cover when disposed in the closed position releasably retaining the cover in the closed position.

2. The protective data holder of claim 1 wherein the software program stored in the onboard memory synchronizes the data between the electronic module, the processor-equipped device linked to the electronic module, and a data storage server remotely located from the protective data holder when executed by the processor-equipped device.

3. The protective data holder of claim 1 wherein the machine or apparatus setup, drawing, or operational data related to at least a portion of the machine or apparatus to which the protective data holder is mounted is stored in a database that is stored in the onboard memory, the database associated with the unique identifier.

4. The protective data holder of claim 1 further comprising a visually perceptible indicia on the protective housing that is associated with the unique identifier stored in the onboard memory.

5. The protective data holder of claim 4 wherein the visually perceptible indicia comprises a code.

6. The protective data holder of claim 1 wherein the onboard memory is comprised of flash memory.

7. The protective data holder of claim 6 wherein the electronic module comprises a flash drive.

8. The protective data holder of claim 1 wherein the electronic module further comprises: (a) one of a wireless transmitter and a wireless transceiver, and (b) a source of electrical power that powers the one of the wireless transmitter and wireless transceiver, and wherein the unique identifier comprises a wireless signal transmitted from the electronic module receivable by a processor-equipped electronic device wirelessly linked to the electronic module.

9. The protective data holder of claim 8 wherein the source of electrical power that powers the one of the wireless transmitter and wireless transceiver comprises an onboard power generation module.

10. The protective data holder of claim 8 wherein the source of electrical power comprises an energy transducer connected to a battery.

11. The protective data holder of claim 1 further comprising a tamper preventing covering attached to the casing and overlying the at least one fastener used to mount the casing to the machine or apparatus, the covering having a visually perceptible identifier thereon that that is associated with the unique identifier stored in the onboard memory, and the covering making tampering with the protective data holder apparent.

12. The protective data holder of claim 11 wherein the tamper preventing covering comprises a plate or label.

13. The protective data holder of claim 1 wherein the cover further comprises a seal extending outwardly from the cover toward the opening of the receptacle with the seal received in the opening of the receptacle when the cover is disposed in the closed position fluid-tightly sealing the electronic module in the receptacle.

14. The protective data holder of claim 13 wherein the receptacle has a recessed seal seat formed about the periphery of the opening having a sealing lip beyond which the seal passes into the receptacle in being received in the seal seat when the cover is disposed in the closed position.

15. The protective data holder of claim 14 wherein the cover has a casing mating surface that overlies the casing end wall in which the receptacle is formed when the cover is disposed in the closed position, and wherein the seal has a sealing bead extending generally parallel to the casing mating surface that is received in the seal seat when the cover is disposed in the closed position.

16. The protective data holder of claim 1 wherein the casing is mounted to the machine or apparatus with the rear wall of the casing disposed toward or against the machine or apparatus, the cover pivotally mounted to the casing by a hinge such that the cover pivots toward the machine or apparatus when moved toward the closed position and pivots away from the machine when moved away from the closed position towards an open position.

17. The protective data holder of claim 16 wherein the cover is releasably fixed in the closed position by a fastener that extends through the cover and threadably engaging the cover anchoring surface of the one of the end walls.

18. The protective data holder of claim 17 wherein the fastener comprises a thumbscrew.

19. The protective data holder of claim 17 wherein cover further comprises an outwardly projecting grip manipulable to pivot the cover between the open and closed positions.

20. A protective data holder for mounting to a machine or apparatus comprising:

(a) an electronic module having onboard memory; and (b) a protective housing in which the electronic module is received and configured for mounting to the machine or apparatus, the protective housing comprised of a casing of one-piece and unitary construction and a cover movable between a closed position preventing access to the electronic module and an open position disposed from the closed position permitting access to the electronic module and, wherein the casing has an elongate receptacle that receives the electronic module formed by a front wall, a rear wall, a pair of sidewalls, and a pair of end walls with an opening of the receptacle formed in one of the end walls, and wherein at least one of the sidewalls has a thickness sufficient to accommodate a plurality of fasteners extending through the front wall, the at least one of the sidewalls, and the rear wall alongside but not through the receptacle in mounting the casing to the machine or apparatus that also provides a cover anchoring surface of the one of the end walls alongside the opening that is engaged by the cover when disposed in the closed position releasably retaining the cover in the closed position.

21. The protective data holder of claim 20 wherein the electronic module has a unique identifier and further comprising a tamper preventing covering attached to the casing and overlying the fasteners used to mount the casing to the machine or apparatus, the covering having a visually perceptible identifier thereon that that is associated with the unique identifier of the electronic module, and the covering making tampering with the protective data holder apparent.

22. The protective data holder of claim 21 wherein the tamper preventing covering comprises a plate or label.

23. The protective data holder of claim 20 wherein the cover further comprises a seal extending outwardly from the cover toward the opening of the receptacle with the seal received in the opening of the receptacle when the cover is disposed in the closed position fluid-tightly sealing the electronic module in the receptacle.

24. The protective data holder of claim 23 wherein the receptacle has a recessed seal seat formed about the periphery of the opening having a sealing lip beyond which the seal passes into the receptacle in being received in the seal seat when the cover is disposed in the closed position.

25. The protective data holder of claim 24 wherein the cover has a casing mating surface that overlies the casing end wall in which the receptacle is formed when the cover is disposed in the closed position, and wherein the seal has a sealing bead extending generally parallel to the casing mating surface that is received in the seal seat when the cover is disposed in the closed position.

26. The protective data holder of claim 20 wherein the casing is mounted to the machine or apparatus with the rear wall of the casing disposed toward or against the machine or apparatus, the cover pivotally mounted to the casing by a hinge such that the cover pivots toward the machine or apparatus when moved toward the closed position and pivots away from the machine when moved away from the closed position towards an open position.

27. The protective data holder of claim 26 wherein the cover is releasably fixed in the closed position by a fastener that extends through the cover and threadably engaging the cover anchoring surface of the one of the end walls.

28. The protective data holder of claim 27 wherein the fastener comprises a thumbscrew.

29. The protective data holder of claim 27 wherein cover further comprises an outwardly projecting grip manipulable to pivot the cover between the open and closed positions.

30. The protective data holder of claim 20 wherein the electronic module further comprises: (a) one of a wireless transmitter and a wireless transceiver, and (b) a source of electrical power that powers the one of the wireless transmitter and wireless transceiver, and wherein the unique identifier comprises a wireless signal transmitted from the electronic module receivable by a processor-equipped electronic device wirelessly linked to the electronic module.

31. The protective data holder of claim 30 wherein the source of electrical power that powers the one of the wireless transmitter and wireless transceiver comprises an onboard power generation module.

32. The protective data holder of claim 31 wherein the source of electrical power comprises an energy transducer connected to a battery.

33. The protective data holder of claim 20 wherein data is stored onboard the memory of the electronic module comprising: (i) machine or apparatus setup, drawing, or operations related data related to at least a portion of the machine or apparatus to which the protective data holder is mounted, (ii) an identifier unique to the protective data holder that is associated with the machine or apparatus to which the protective data holder is mounted, and (iii) a software program readable and executable by a processor-equipped electronic device linked to the electronic module that transfers data between the onboard memory of the electronic device and the processor-equipped electronic device including synchronization of the data between the electronic module, the processor-equipped device linked to the electronic module, and a data storage server remotely located from the protective data holder when the software program read by the processor-equipped device is executed by the processor-equipped device.

34. The protective data holder of claim 33 wherein the machine or apparatus setup, drawing, or operational data related to at least a portion of the machine or apparatus to which the protective data holder is mounted is stored in a database that is stored in the onboard memory, the database associated with the unique identifier.

35. The protective data holder of claim 34 further comprising a visually perceptible indicia on the protective housing that is associated with the unique identifier stored in the onboard memory.

36. The protective data holder of claim 35 wherein the visually perceptible indicia comprises a code.

37. A protective data holder for mounting to a machine or apparatus comprising:
  (a) an electronic module on which is stored: (1) machine or apparatus setup, drawing, or operations related data related to at least a portion of the machine or apparatus to which the protective data holder is mounted, (2) an identifier unique to the protective data holder that is associated with the machine or apparatus to which the protective data holder is mounted, and (3) a software program readable and executable by a processor-equipped electronic device connected to the electronic module, the software program enabling data transfer between the electronic module and the processor-equipped electronic device including synchronization of data between the electronic module, the processor-equipped device linked to the electronic module, and a data storage server remotely located from the protective data holder when the software program read by the processor-equipped device is executed by the processor-equipped device; and
  (b) a protective housing in which the electronic module is disposed and configured for mounting to the machine or apparatus, the protective housing comprised of a casing of one-piece and unitary construction pivotally attached to a cover movable between a closed position preventing access to the electronic module and an open position disposed from the closed position permitting access to the electronic module and, wherein the casing has an elongate receptacle that receives the electronic module formed by a front wall, a rear wall, a pair of sidewalls, and a pair of end walls with an opening of the receptacle formed in one of the end walls, and wherein at least one of the sidewalls has a thickness sufficient to accommodate at least one fastener extending through the front wall, the at least one of the sidewalls, and the rear wall alongside but not through the receptacle in mounting the casing to the machine or apparatus that also provides a cover anchoring surface of the one of the end walls alongside the opening that is engaged by the cover when disposed in the closed position releasably retaining the cover in the closed position.

38. The protective data holder of claim 37 further comprising a tamper preventing covering attached to the casing and overlying the fasteners used to mount the casing to the machine or apparatus, the covering having a visually perceptible identifier thereon that that is associated with the unique identifier of the electronic module, and the covering making tampering with the protective data holder apparent.

39. The protective data holder of claim 38 wherein the tamper preventing covering comprises a plate or label.

40. The protective data holder of claim 37 wherein the cover further comprises a seal extending outwardly from the cover toward the opening of the receptacle with the seal received in the opening of the receptacle when the cover is disposed in the closed position fluid-tightly sealing the electronic module in the receptacle.

41. The protective data holder of claim 40 wherein the receptacle has a recessed seal seat formed about the periphery of the opening having a sealing lip beyond which the seal passes into the receptacle in being received in the seal seat when the cover is disposed in the closed position.

42. The protective data holder of claim 41 wherein the cover has a casing mating surface that overlies the casing end wall in which the receptacle is formed when the cover is disposed in the closed position, and wherein the seal has a sealing bead extending generally parallel to the casing mating surface that is received in the seal seat when the cover is disposed in the closed position.

43. The protective data holder of claim 37 wherein the casing is mounted to the machine or apparatus with the rear wall of the casing disposed toward or against the machine or apparatus, the cover pivotally mounted to the casing by a hinge such that the cover pivots toward the machine or apparatus when moved toward the closed position and pivots away from the machine when moved away from the closed position towards an open position.

44. The protective data holder of claim 43 wherein the cover is releasably fixed in the closed position by a fastener that extends through the cover and threadably engaging the cover anchoring surface of the one of the end walls.

45. The protective data holder of claim 44 wherein the fastener comprises a thumbscrew.

46. The protective data holder of claim 44 wherein cover further comprises an outwardly projecting grip manipulable to pivot the cover between the open and closed positions.

* * * * *